US005791372A

United States Patent [19]

Mukumoto

[11] Patent Number: 5,791,372
[45] Date of Patent: Aug. 11, 1998

[54] RELIEF VALVE

[75] Inventor: Eiichi Mukumoto, Takarazuka, Japan

[73] Assignee: Konan Electric Company Limited, Hyogo, Japan

[21] Appl. No.: 563,565

[22] Filed: Nov. 30, 1995

[51] Int. Cl.[6] ..................... F16K 17/10

[52] U.S. Cl. ..................... 137/462; 137/474; 137/490; 137/508; 137/512.3; 137/614.2

[58] Field of Search ..................... 137/462, 472, 137/474, 490, 508, 512.3, 614.2

[56] References Cited

U.S. PATENT DOCUMENTS

| | | | |
|---|---|---|---|
| 854,047 | 5/1907 | Leber | 137/462 |
| 3,040,771 | 6/1962 | Droitcour et al. | 137/614.2 |
| 3,054,420 | 9/1962 | Williams | 137/508 |
| 5,676,172 | 10/1997 | Mukumoto | 137/490 X |

FOREIGN PATENT DOCUMENTS

| | | |
|---|---|---|
| 7133875 | 5/1995 | Japan . |

*Primary Examiner*—Stephen M. Hepperle
*Attorney, Agent, or Firm*—Birch, Stewart, Kolasch & Birch, LLP

[57] ABSTRACT

The invention intends to provide a relief valve which can prevent malfunction caused by generation of negative pressure lowering the minimum pressure to be originally maintained by a load circuit.

Maloperation of a relief valve 401 is prevented by allowing a check valve 423 for preventing a backflow from a main valve element 410 and pilot valve element 412 side to a load port side 402 to be intervened at a pressure chamber 408 between a load port 406 connected to a load circuit, a main valve element 410, and a pilot valve element 412 and by applying a hydraulic lock when negative pressure lower than the minimum pressure to be originally maintained by a load circuit is generated. And by communicating a downstream chamber 425 downstream of the check valve 423 to a return port 407 with a reset oil passage 429 which is opened and closed by a reset valve 430, the hydraulic lock is designed to be released.

4 Claims, 15 Drawing Sheets

RELIEF VALVE

BACKGROUND OF THE INVENTION

The invention relates to a relief valve, and more specifically, to a relief valve which can prevent malfunction due to negative pressure lowering the minimum pressure to be maintained originally in the load circuit accompanied by stopping and sticking of high-speed cylinder directly connected to brake-through load or fluctuating load such as punching or fluctuating load processing in forging machines such as presses.

The relief valve is designed to open when internal pressure of a hydraulic circuit exceeds a specified value, release pressurized oil of the hydraulic circuit to a relief oil passage, and recover internal pressure of the hydraulic circuit to a specified value, and is used, for example, for setting supply oil pressure of a hydraulic circuit or for an overload prevention safety device for presses.

The overload safety device for presses is designed, for example, in such a manner as shown in FIG. 7, in which hydraulic fluid is sucked into a hydraulic pump 503 via an oil feed passage 502 from an oil tank 501, the pressurized oil is fed to a hydraulic cylinder 508 formed inside a slide 507 of the press 506 via a load circuit 505 with a check valve 504 intervened and is filled in a hydraulic cylinder 508 to secure a cushion size volume, the press 506 operates the slide 507 vertically at a stroke of a specified size by the crank mechanism 550 and processes work 553 with dies 552 mounted to the slide 507 or a bolster 551, but if the press improperly lowers due to defective adjustment of the stroke range height of the slide 507 of the press 506 or work 553 with excessively large thickness is charged, the slide 507 or dies 552 bite into the work 553 on the bolster 551 and enters the overload state, but boosted oil of the hydraulic cylinder 508 is released to the oil tank 501 via a relief oil passage 510 from the relief valve 509 connected to the load circuit 505 and retracts the hydraulic cylinder 508 only by the cushion size volume so that the slide 507 can pass the bottom dead center, thereby preventing overload and protecting the dies 552 and the press 506.

For the hydraulic pump 503, those which automatically stop when internal pressure of the load circuit 505 and the hydraulic cylinder 508 exceeds a specified value and automatically restarts when it lowers below a specified value is used, and as shown in FIG. 8, the hydraulic pump 503 is assembled integral with the relief valve 509. For the relief valve 509, the one which is designed to release a large flow rate for absorbing the overload and to release a small flow rate for temperature compensation for increase of pressurized oil temperature is used.

On one side of the valve case 511 of the relief valve 509, a suction port 512 which introduces the hydraulic fluid to the hydraulic pump 503, a load port 513 to which the load circuit 505 is connected, and a return port 514 which is connected to the relief circuit are opened and in this valve case 511, a pressure chamber 515 in free communication with the check valve 504 and the load port 513 and a valve chest 516 concentrically following the other end of this pressure chamber 515 and in free communication with the return port 514, and a pressure setting chamber 530 concentrically in free communication with the valve chest 516 are formed.

To the said valve chest 516, a main valve element 517 is slidably inserted in the concentric direction in common with the valve chest 516, and a guide sleeve 531 formed in a stepped cylinder shape following this main valve element 517 is slidably internally fitted to the pressure setting chamber 530.

At the core of the said main valve element 517, an oil passing hole 518 is formed, inside of which a pilot valve element 519 is inserted free to advance and retreat in the axial direction of the main value element 517.

As shown in FIG. 9 to FIG. 12, the said oil passing hole 518 comprises holes with different diameters in which a small-diameter section 520, a taper section 521 where the diameter gradually increases, and a large diameter section 522 concentrically continue in order of the flow from the pressure chamber 515 side, and at the connections between the small-diameter section 520 and the taper section 521 of this oil passing hole 518, a pilot valve seat 523 is formed. At the large-diameter section 522 of this oil passing hole 518, a main valve hole 525 is formed, which is in free communication with the portion of the valve chest 516 on the external circumference of the main valve element 517.

Throughout the pilot valve seat 523 or the large-diameter section 522 of this oil passing hole 518, the pilot valve element 519 is inserted free to advance or retreat in the axial direction of the oil passing hole 518, and at the edge of this pilot valve element 519 on the pressure chamber 515 side, a pilot valve face 524 comprising a taper face opposing the said taper section 521 and the pilot valve seat 523 is formed.

The circumferential surface 544 of the pilot valve element 519 is designed to come slidably in contact with the large-diameter section 522 throughout the full length of the circumference, and when the isolating distance of this pilot valve face 524 to the pilot valve seat 523 exceeds a specified value, the said main valve hole 525 is designed to open, and when the isolating distance of this pilot valve face 524 to the pilot valve seat 523 is short of a specified value, the said main valve hole 525 is designed to be closed.

As shown in FIG. 8, the guide sleeve 531 internally fitted to the said pressure setting chamber 530 has a hollow section continuously following the oil passing hole 518 of the main valve element 517, and to this hollow section, a spring support seat 548 is arranged free to advance and retreat in the axial direction of the pressure setting chamber 530, and to this spring support seat 548, a connecting rod 533 is internally fitted, and an adjusting screw 534 inserted free to be driven forward and backward to the end wall 538 of the valve case 511 is rotatably connected, and rotating this adjusting screw 534, the spring support seat 548 advances and retreats in the pressure setting chamber 530 via the said connecting rod 533, and by fixing this adjusting screw 534 to the valve case 511 with a fixing screw 535, the position of the spring support seat 548 is fixed.

To the pilot valve element 519, a center hole 545 is drilled through along the shaft center, and the tip end of the shaft-form support 527 protruding from the said spring support seat 548 is allowed to rush into this center hole 545.

As shown in FIG. 9 to FIG. 12, to the tip end of this support 527, a head 541 expanded in a stepped form is formed, and to this head 541, a sealing member 542 comprising O-rings and a backup ring 543 are externally fitted and supported.

By expanding the pressure chamber 515 side of the center hole 545 of the pilot valve element 519 in a stepped form, a sub valve chest 536 is formed, and to this sub valve chest 536, a sub valve element 537 externally fitted to the tip end of the support 527, sealing member 542, and backup ring 543 free to advance and retreat is inserted.

The center hole 545 of this sub valve element 537 is formed with holes with different diameters, and by receiving the stepped surface 554 with the end surface 555 of the head 548 on the pressure setting chamber 530 side, the sub valve element 537 is prevented from escaping from the support 527 to the pressure chamber 515 side, and by allowing the sealing member 542 to closely adhere to the inner circumferential surface of this center hole 545, the clearance between the sub valve element 537 and the support 527 can be sealed.

This sub valve element 537 comprises a cylindrical surface 556 slidably and internally in contact with the sub valve chest 536 and a sub valve surface 557 in a cone shape following the pressure setting chamber 530 side, and by bringing the sub valve seat 546 formed in the sub valve chest 536 into contact and isolating it from the pressure chamber 515, the clearance between the sub valve element 537 and the pilot valve element 519 is opened and closed by a poppet system.

As shown in FIG. 9, internal pressure of the pressure chamber 515 moves to the pressure chamber 515 side when it is below the specified pressure, and between the support 527 and the pilot valve element 519 when the support end face 550 is isolated from the end face 549 at the depth of the valve case, the end face 555 of the head 541 of the support 527 presses and closes the sub valve surface 557 of the sub valve element 537 against the sub valve seat 546 of the pilot valve element 519 via the stepped surface 554 off the sub valve element 537, and at the same time, as shown in FIG. 10 to FIG. 12 internal pressure of the pressure chamber 515 moves to the pressure setting chamber 530 side when it exceeds the specified pressure, and between the support 527 and the pilot valve element 519 when the support end face 550 comes in contact with the end face 549 at the depth of the valve case, a support spring **526*a* is arranged for generating force to either press or energize the pilot valve face 524 of the pilot valve element 519 against the pilot valve seat 523 of the main valve element 517**.

In addition, as shown in FIG. 9 to FIG. 12, between the spring support seat 548 and the pilot valve element 519, there arranged is a pressure setting spring **526*b* for generating force to press the pilot valve face 524 of the pilot valve element 519 against the pilot valve seat 523 of the main valve element 517 and energizing it on the pilot valve seat 523** side.

The main valve element 517 and the pilot valve element 519 move to the pressure chamber 515 side with the relevant pressure setting spring **526*b* when internal pressure of the pressure chamber 515 is lower than the specified pressure, and the main valve element center end face 540 returns to the valve case, comes in contact to the side end face 539, restricting the move to the pressure chamber 515 side, and when internal pressure of the pressure chamber 515 exceeds the specified pressure, they move to the pressure setting chamber 530 side by internal pressure of the pressure chamber 515 opposite to the relevant pressure setting spring 526*b*, and the main valve element 517 has the guide sleeve 531 brought in contact with the valve case center end face 547, and the pilot valve element 519 has the support end face 550 brought in contact with the valve case depth end face 549, restricting the move to the pressure setting chamber 530** side.

When internal pressure of the pressure chamber 515 is below the specified pressure and the main valve element 517 and the pilot valve element 519 have moved to the pressure chamber 515 side, the sub valve surface 557 of the sub valve element 537 presses and closes the sub valve seat 546 of the pilot valve element 519 with spring force of the support spring **526*a*, and when internal pressure of the pressure chamber 515 exceeds the specified pressure, they move to the pressure setting chamber 530 side and the support end face 550 comes in contact with the valve case depth end face 549, and when the move to the pressure setting chamber 530 side is restricted, the pressure chamber 515 side end face 551 of the sub valve element 537 bears internal pressure of the pressure chamber 515 exceeding the specified pressure and generates thrust to the pressure setting chamber 530 side, and the sub valve face 557 of the sub valve element presses and closes the sub valve seat 546 of the pilot valve element 519**.

As shown in FIG. 9 to FIG. 12, a pilot chamber 528 is formed between the taper section 521 of the main valve element 517 and the pilot valve surface 524 of the pilot valve element 519, and an orifice 529 which communicates this pilot chamber 528 with the portion of the valve chest 516 on the outer circumference of the main valve element 517 is formed on the main valve element 517.

When the press is at standstill, internal pressure of the pressure chamber 515 is held to atmosphere (pressure: 0), and as shown in FIG. 9, the main valve element 517 is located at the position where it has moved farthest to the pressure chamber 515 side, and the pilot valve element 519 is energized to be located at the position where it is received to the pilot valve seat 523 by the pressure setting spring **526*b***.

For preparing for driving the press, the hydraulic pump 503 is started, and when internal pressure of the pressure chamber 515 exceeds the specified pressure, the main valve element 517 and the pilot valve element 519 are moved to the pressure setting chamber 530 side while resisting to the pressure setting spring **526*b* by internal pressure of the pressure chamber 515, and as shown in FIG. 10, the guide sleeve 531 is received with the valve case center end face 547 of the valve case 511, the move of the main valve element 517 to the pressure setting chamber 530 side is restricted, and in addition, the support end face 550 comes in contact with the valve case depth end face 549, and the pilot valve element 519 presses and closes the pilot valve surface 524 against the pilot valve seat 523 of the main valve element 517 with the energizing force of the support spring 526*a* and pressure setting spring 526*b***.

And when internal pressure of the pressure chamber 515 reaches the preload pressure, the hydraulic pump 503 stops. In this event, the support spring **526*a* contributes to securing the minimum reference value of relief pressure (for example, 2 MPa), and screwing the adjusting screw 534 varies the spring force of the pressure setting spring 526*b***, contributing to adjusting pressure setting in the relief pressure setting range (for example, 2–3.5 MPa) exceeding the minimum reference value.

Because by allowing the support end face 550 to come in contact with the valve case depth end face 549, influences of internal pressure of the pressure chamber 515 on the pressure bearing area of the end face formed on the pressure chamber 515 side by the head 541 of the support 527 and the sub valve element 537 are eliminated, and the pilot valve element 519 bears internal pressure of the pressure chamber 515 with a small doughnut-ring-shape pressure bearing area between the sub valve seat 546 of the pilot valve element 519 and the pilot valve seat 523 of the main valve element 517, the energizing force to oppose this pressure can be reduced, and to oppose high relief pressure (for example, Max. 3.5 MPa), using the small support spring **526*a* and the pressure setting spring 526*b*, the pilot valve face 524 of the pilot valve element 519 can be pressed against the pilot valve seat 523 of the main valve element 517 or energized to the relevant pilot valve seat 523** side, and a compact relief valve mechanism with low inertia and high response can be formed.

When internal pressure of the pressure chamber 515 reaches the preload pressure and if for example, a hydraulic jack is used for the slide to apply load for carrying out static setting of the required relief pressure after the hydraulic pump 504 stops, internal pressure of the pressure chamber 515 increases in proportion to the increase of the load, and internal pressure of the pressure chamber 515 is loaded to the doughnut-ring-shape pressure bearing area between the sub valve seat 546 of the pilot valve element 519 and the pilot valve seat 523 of the main valve element 517, and if the thrust by this oil pressure exceeds the set pressure of the support spring 526*a* and the pressure setting spring 526*b*, as shown in FIG. 11, the pilot valve element 519 separates from the pilot valve seat 523, allowing the pressurized oil in the pressure chamber 515 to pass the small-diameter section 520, pilot valve seat 523, pilot chamber 528, orifice 529, and the valve chest 516, and flow out from the return port 514.

After the adjusting screw 534 is driven to advance or retreat the spring support seat 548 with the pressure setting chamber 530 so that the pressure of the pressurized oil chamber when relief oil comes out from this return port 514 becomes the overload relief pressure (for example, 3 MPa) and then, the energizing force of the support spring 526*a* and pressure setting spring 526*b* is adjusted, this adjusting screw 534 is fixed to the valve case 511 with the fixing screw 535.

In this case, because even when the sealing member 542 is pressed against the inner circumferential surface of the sub valve element 537 by pressure of the pressure chamber 515, pressure increase of the pressure chamber 515 is considerably slow as compared to that when overload occurs and the move of the pilot valve element 519 and the sealing member 542 become also slow, the sub valve element 537 moves to the pressure setting chamber 530 side together with the pilot valve element 519 while the sub valve element 537 is being received with the sub valve seat 546 by the pressure of the pressure chamber 515, and there is no fear of leaking of pressurized oil from the pressure chamber 515 to the pressure setting chamber 530 through the clearance between the pilot valve element 519 and the sub valve element 537.

When dynamic pressure setting is carried out by using the relief valve 509 set for static pressure in this way, the sealing member 542 is pressed against the inner circumferential surface of the sub valve element 537 by the pressure of the pressure chamber 515 and stops the sub valve element 537 which suddenly tries to move to the pressure setting chamber 530 side as shown in FIG. 11 to FIG. 12 when overload occurs, but by the lubricating action of the pressurized oil pressure-fed from the pressure chamber 515 side to the fine clearance between the sub valve element 537 and the support inserting hole 536 of the pilot valve element 519, the pilot valve element 519 can move remarkably smoothly with respect to the sub valve element 537. As a result, the difference between the dynamic set pressure and the static set pressure becomes about ±2%, and at the same time the variation of dynamic set pressure also becomes within ±1%.

When overload occurs with the press normally driven, the pilot valve element 519 opens slightly, and as soon as it separates from the pilot valve seat 523, a large volume of compressed oil flows in the pilot chamber 528 and pressurized oil works on throughout the full length of the surface of the pilot valve face 524, and the opening pressure bearing area of the pilot valve element 519 suddenly and greatly changes instantaneously from the small doughnut-ring shape between the sub valve seat 546 and the pilot valve seat 523 of the main valve element 517 to a large doughnut-ring-shape pressure bearing area between the sub valve seat 546 and the circumference of the main valve element 517, and large hydraulic thrust is generated to resist the support spring 526*a* and pressure setting spring 526*b*, and the pilot valve element 519 instantaneously moves to the pressure setting chamber 530 side and at the same time pressurized oil works on throughout the full length of the whole surface of the taper section 524 with a large pressure bearing area which instantaneously generates large valve opening thrust on the pressure chamber 515 side, and the main valve element 517 generates large hydraulic valve opening thrust that moves rapidly to the pressure chamber 515 side to resist against the small valve closing thrust in the direction of the pressure setting chamber 530 side which internal pressure of the pressure chamber 515 generates and woks on the pressure chamber 515 side end face 553 of the small pressure bearing area of the main valve element 517 when the pilot valve element 519 closes the pilot valve seat 523, and finally, the main valve element 517 rapidly opens fully.

As a result, the main valve element 517 and the pilot valve 519 oppose each other and rapidly open, and the main valve hole 525 instantaneously opens, and a large volume of pressurized oil passes this main valve hole 525 to escape to the valve chamber 516, instantaneously canceling the overload condition.

Because the clearance between the circumferential surface of the sub valve chest 536 of the pilot valve element 519 and the sub valve element 537 is small, even if the sub valve element 537 is separated from the sub valve seat 546 when overload occurs, by the restricting action of this clearance, leakage of pressurized oil from the pressure chamber 515 to the pressure setting chamber 530 through the clearance between the pilot valve element 519 and the sub valve element 537 can be prevented.

Now, when the press operates and press-forming begins, the load gradually increases and in response to this, internal pressure of the load circuit 505 and hydraulic cylinder 508 increases, and as shown in FIG. 13 and 14, the press proper elastically deforms and energy is accumulated. And at brake-through when the load suddenly disappears upon completion of punching, each one of the above presses suddenly releases energy accumulated by elastic deformation and tries to return to the normal shape, exerting a force opposite to the load at the time of press-forming to the press, and as a result, the hydraulic cylinder 508 rapidly extends by inertia, causing internal pressure of the load circuit 505 and hydraulic cylinder 508 to suddenly decrease, and if the hydraulic cylinder 508 excessively extends by inertia of for example, the slide 507 in this event, as shown in FIG. 15, internal pressure of the load circuit 505 reaches negative pressure lower than the preload pressure, which should be the minimum pressure to be originally maintained for the load circuit 505, converging to the preload pressure while pulsating over the range between the maximum and minimum of the preload pressure.

It has also been identified that by the static operation of general hydraulic cylinders which operate at high variable speed and general hydraulic cylinders, negative pressure is achieved in the similar manner and there is a case in which the internal pressure converges to the preload pressure while pulsating over the range between the maximum and minimum of the preload pressure.

When the brake-through load works as described above and causes internal pressure of the pressure chest 515 to reach the negative pressure, such pressure rushes into the pressure chamber 515 side of the main valve element 517 or the pilot valve element 519, and the main valve element 517 with large pressure bearing area is greatly subject to this negative pressure. Therefore, as shown in FIG. 12, there is a fear in which the pilot valve seat 523 separates from the pilot valve surface 524 and malfunctions, and because the main valve element 517 and pilot valve element 519 advance and retreat, respectively, by pulsation of internal pressure of the pressure chest 515, the sealing force between the pilot valve element 519 and pilot valve member 523 becomes unstable, causing malfunction as shown in FIG. 12, though it is not under overload condition.

In view of the foregoing, this invention has been made, and it is a main object of this invention to provide a high-speed high-flow rate relief valve which can prevent malfunction caused by negative pressure lower than the minimum pressure to be originally maintained for the load circuit following brake-through or sticking operation of the cylinder.

Another object of this invention is to provide a relief valve based on a design philosophy to achieve a zero mechanical state (a condition in which energy existing in the equipment is zero when the equipment is at standstill) as one of the recent safety design philosophies as well as to achieve stability of the relief valve against high and low pulsating pressure.

In order to achieve the above object, this invention related to a relief valve comprising a valve case in which a load port connected to the load circuit a return port to which the return oil passage is connected, and an internal oil passage which freely communicates the load port and the return port, and a relief valve element which opens the internal oil passage when pressure of the load circuit exceeds the specified value and closes the internal oil passage when pressure of the load circuit lowers the specified value, characterized by allowing a check valve for preventing backflow from the valve element side to the load port side to intervene at the portion of the internal oil passage between the load port and the relief valve element.

With this configuration, when the load circuit reaches negative pressure, the check valve closes, applying a hydraulic lock to prevent the relief valve element from rushing into the load port side.

In this invention, in particular, if a reset oil passage allowing the portion of the internal oil passage between the check valve and the relief valve element to be in free communication with the return port and a reset valve for opening and closing this reset oil passage are equipped, it is possible to reset pressurized oil at the load port by canceling the hydraulic lock by allowing the portion of the internal oil passage between the check valve and relief valve to be in free communication with the return port by the reset oil passage with a slight opening of the reset valve and by reducing pressure between the check valve and relief valve element which gradually increase pressure by the said hydraulic lock by repeating load fluctuation.

It is also possible to release internal pressure at the load port to atmosphere following the internal pressure between the check valve and the relief valve element as soon as the hydraulic lock is canceled by allowing the portion of the internal oil passage between the check valve and the relief valve to be in free communication with the return port by the reset oil passage with the reset valve fully open.

DESCRIPTION ON PREFERRED EMBODIMENTS

A relief valve related to one embodiment of this invention will be specifically described as follows based on the accompanying drawings.

Figure 1:
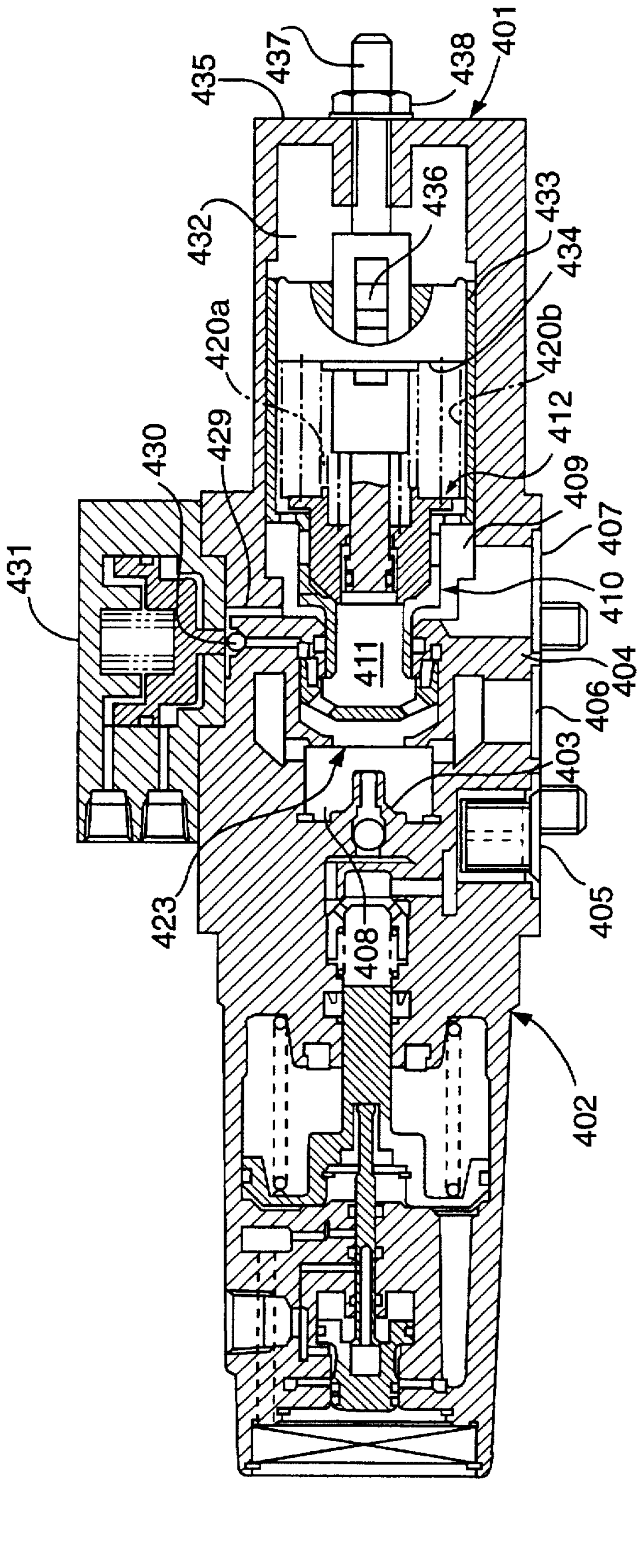
FIG. 1 is a cross section of one embodiment of this invention when a check valve is open.

As shown in FIG. 1, the relief valve related to one embodiment of this invention is used for an overload prevention device for presses, and this relief valve 401 is assembled integral with a hydraulic pump 402.

On one side of the valve case 404 of the relief valve 401, an inlet port 405 for introducing the hydraulic fluid to the hydraulic pump 402, a load port 406 connected to the load circuit, and a return port 407 connected to the relief circuit are opened, and inside the valve case 404, a pressure chamber 408 in free communication with the discharge valve 403 of the said hydraulic pump 402 and the load port 406, a valve chest 409 concentrically following this pressure chamber 408 and in free communication with the said return port 407, and in addition, a pressure setting chamber 432 concentrically following the valve chest 409 are formed.

To the valve chest 409, stepped cylinder form main valve element 410 is slidably inserted in the axial direction, and the guide sleeve 433 following this main valve element in the form of stepped cylinder is slidably and internally fitted to the pressure setting chamber 432, and in addition, at the core of the said main valve element 410, and to an oil passing hole 411 formed at the center of the said main valve element 410, a pilot valve element 412 is inserted free to advance and retreat in the axial direction of the main valve element 410.

As shown in FIG. 2 to FIG. 6, the said oil passing hole 411 is formed in holes of different diameters comprising a small-diameter section 413, a taper section 414 whose diameter gradually increases, and a large-diameter section 415 continuously in a concentric form from the pressure chamber 408 side in that order, and at the connections between the small-diameter section 413 and the taper section 414, a pilot valve seat 416 which a pilot valve element 412 comes in contact with and is isolated from is formed.

The pilot valve element 412 is slidably and internally fitted to the large diameter section 415 and at the edge on the pressure chamber 408 side, a pilot valve surface 417 comprising the said taper section 414 and a taper surface resisting to the pilot valve seat 416 is formed.

At the large-diameter section 415 of the main valve element 410, a main valve element 418 which allows the oil passing hole 411 free communication with the valve chest 409 on the external circumference of the main valve element 410 is formed, and the circumferential surface 419 of the pilot valve element 412 is brought slidably and internally in contact with the said large-diameter section 415 throughout the whole circumference, and when the isolating distance from the pilot valve seat 416 of the said pilot valve surface 417 exceeds a specified value, the said main valve hole 418 opens and when the isolating distance from the pilot valve seat 416 of the pilot valve surface 417 is smaller than a specified value, the said main valve hole 418 is closed.

Figure 6:
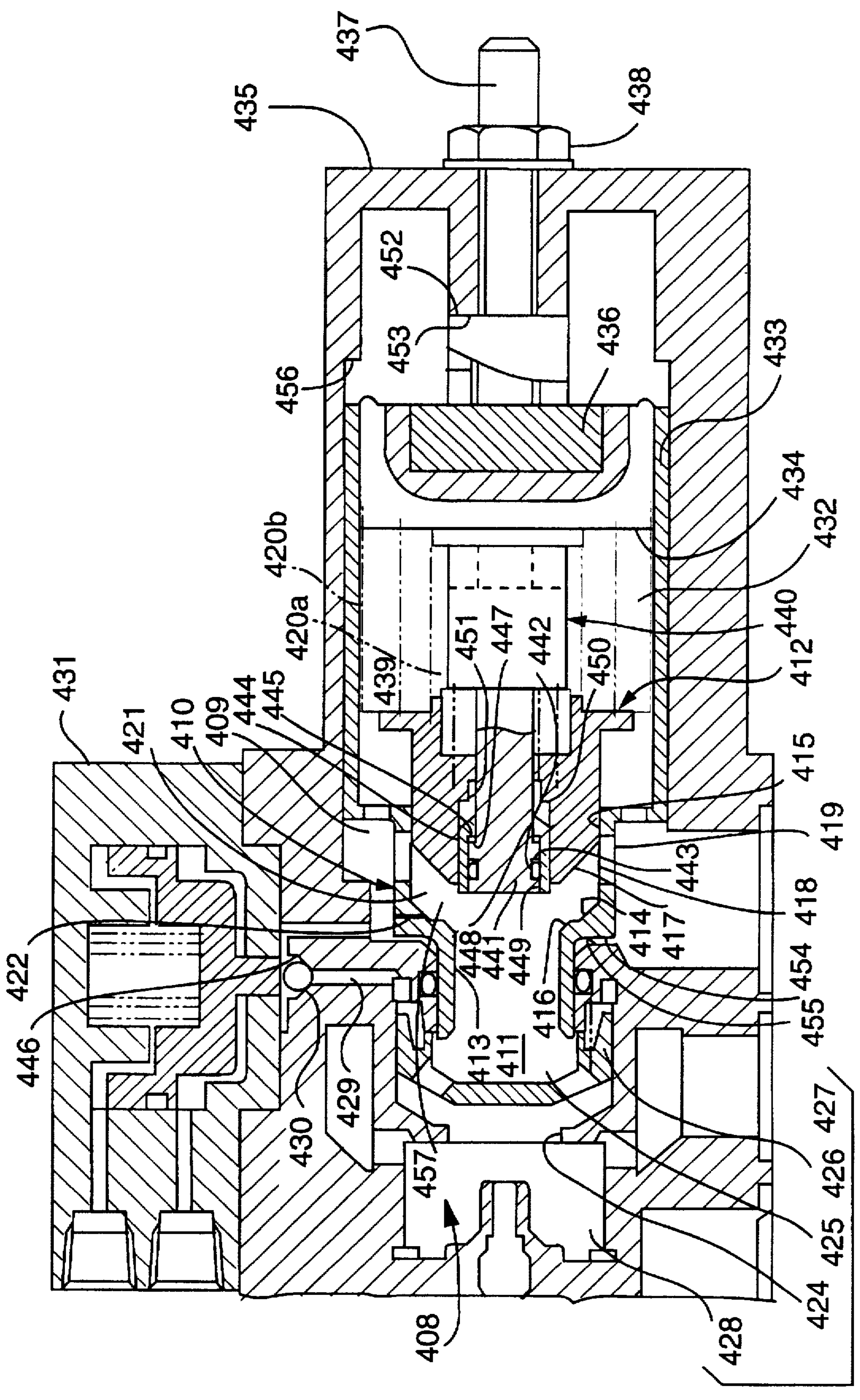
FIG. 6 is a cross section of an essential part of one embodiment of this invention when the check valve is fully open by full opening of the relief valve.
Figure 7:
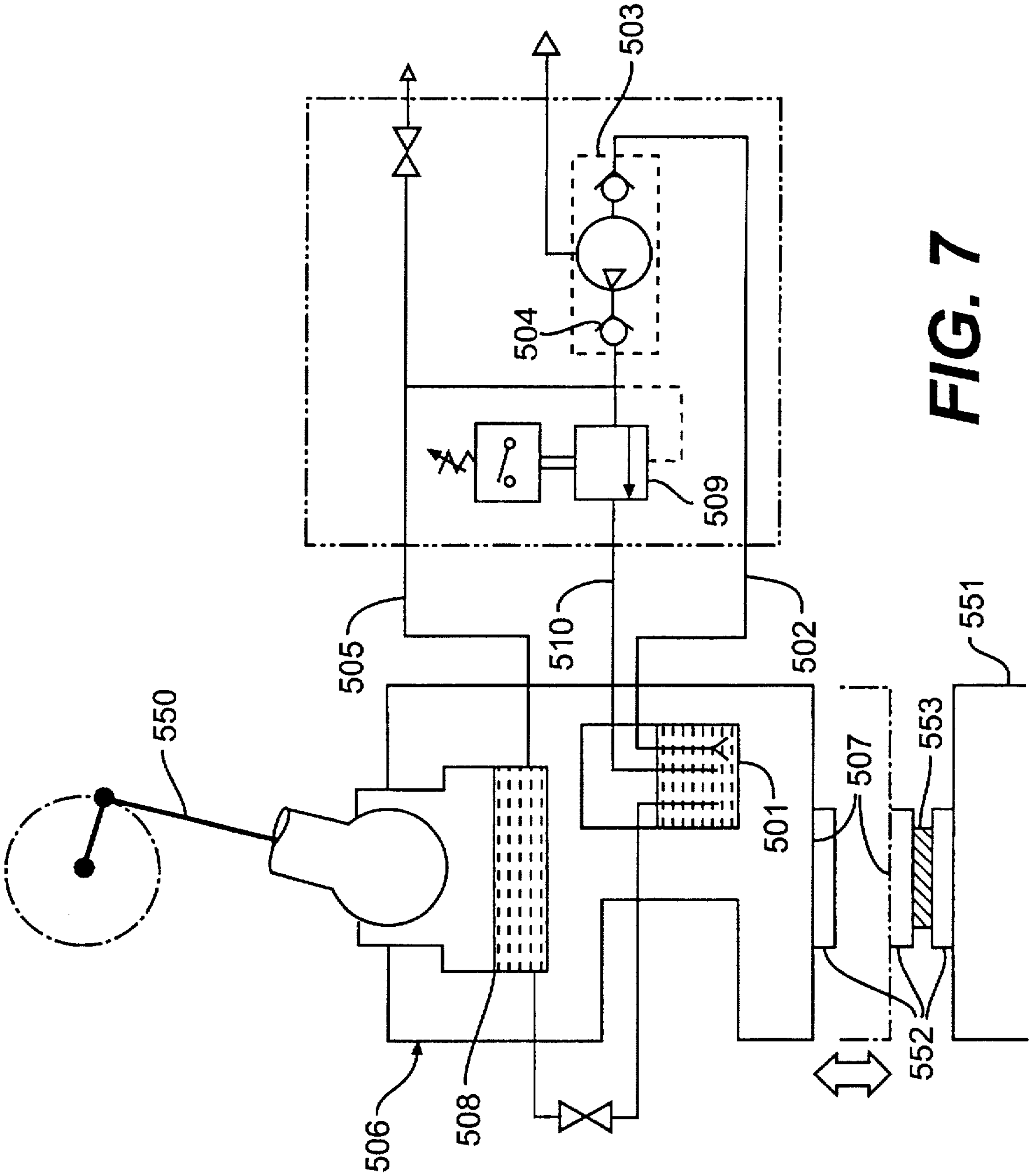
FIG. 7 is a hydraulic circuit diagram of an overload safety device of a press.
Figure 8:
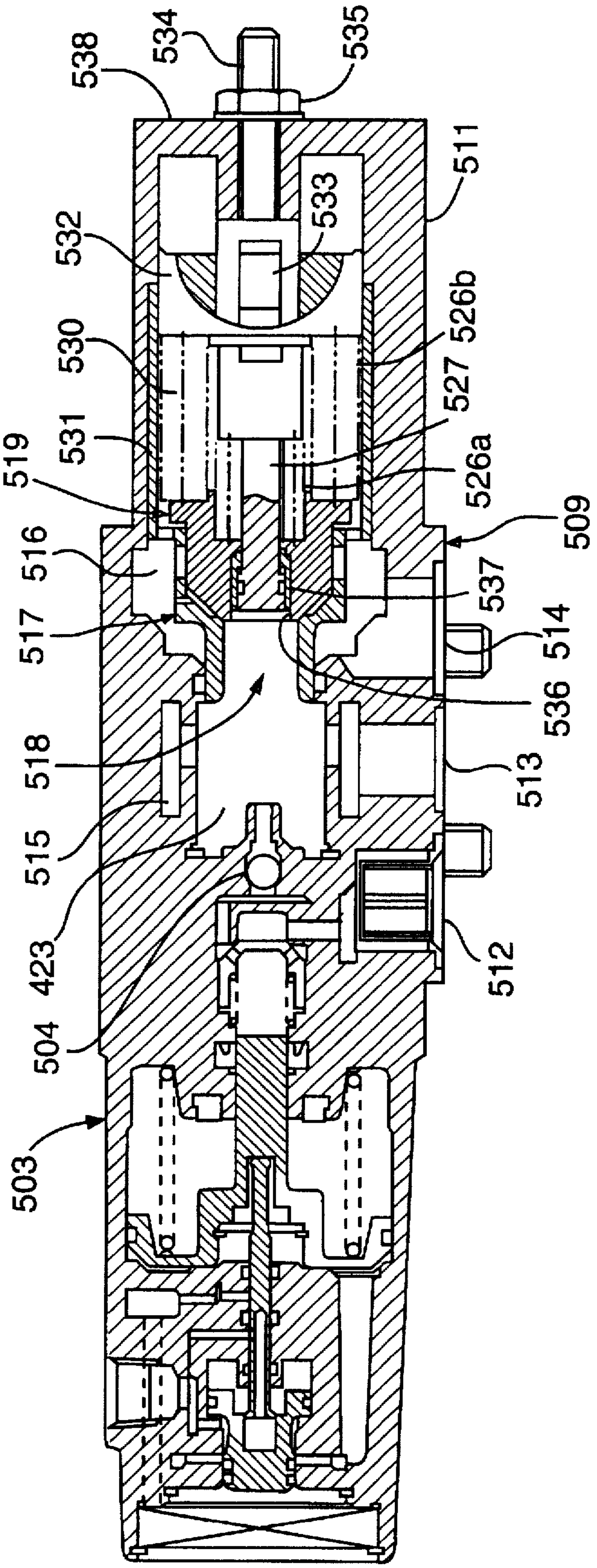
FIG. 8 PRIOR ART
FIG. 8 is a cross section of a conventional example.
Figure 9:
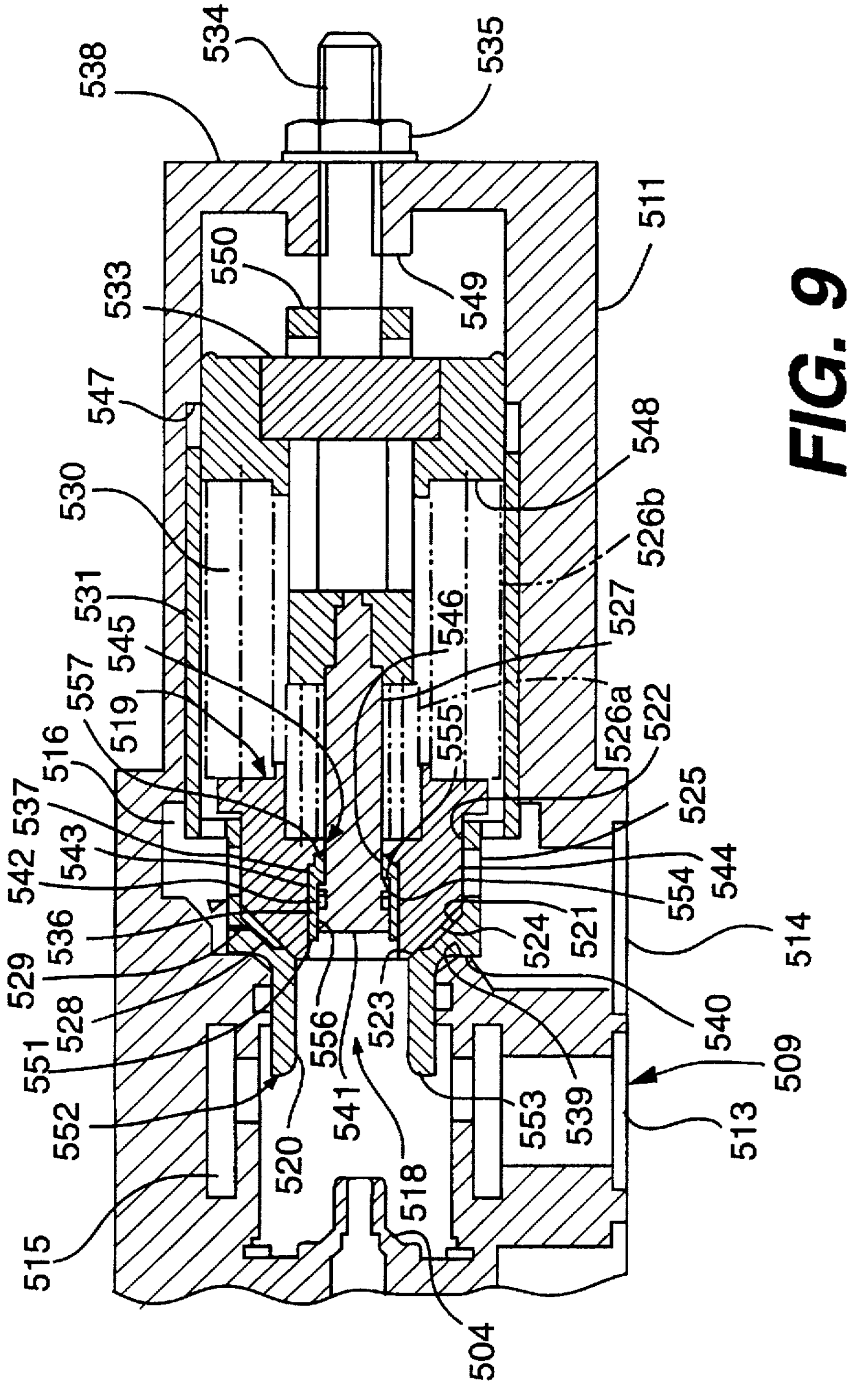
FIG. 9 PRIOR ART
FIG. 9 is a cross section of an essential part of a conventional example when oil pressure is atmosphere (0 pressure)
Figure 10:
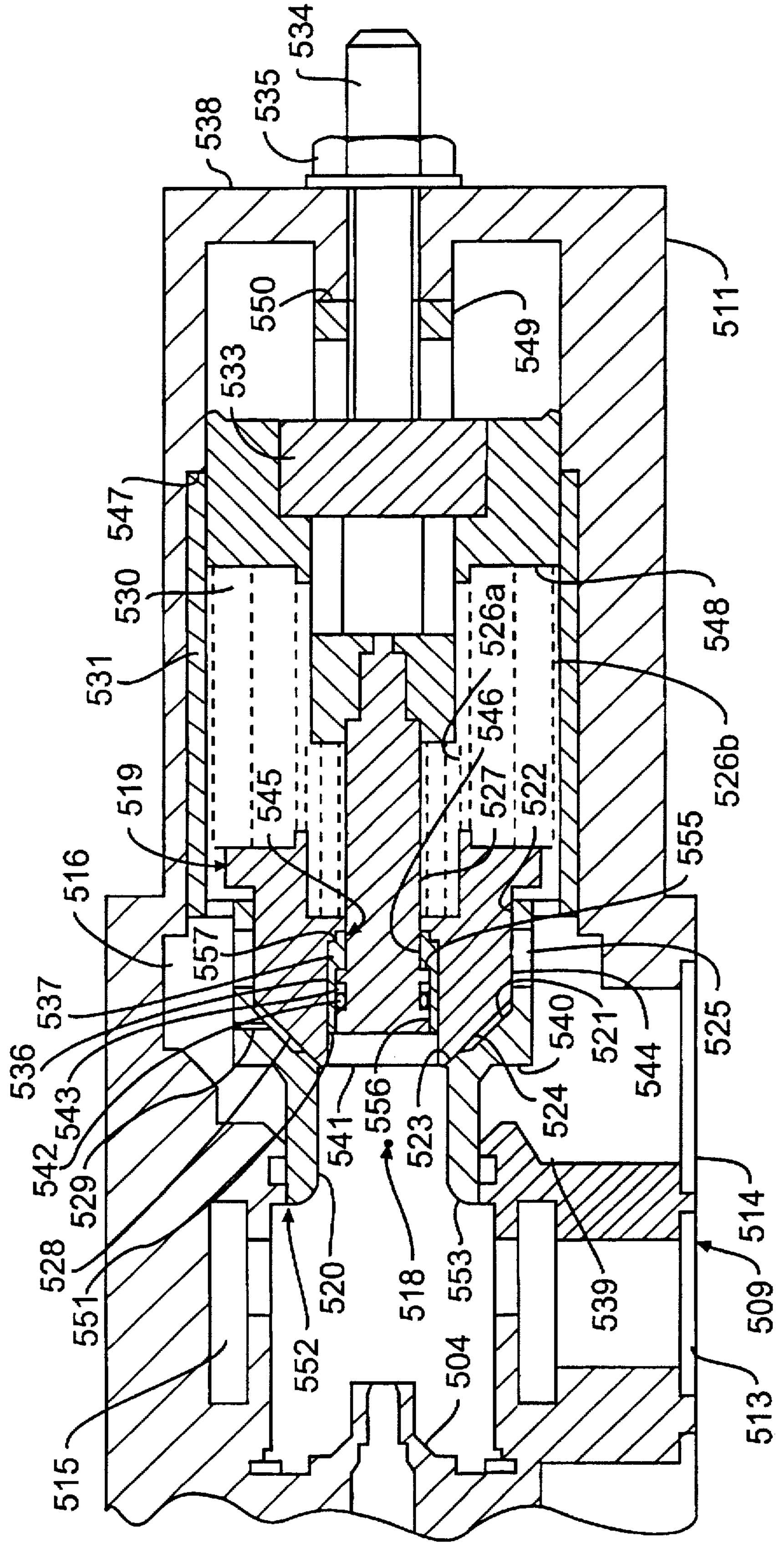
FIG. 10 PRIOR ART
FIG. 10 is a cross section of an essential part of a conventional example in the preload condition.
Figure 11:
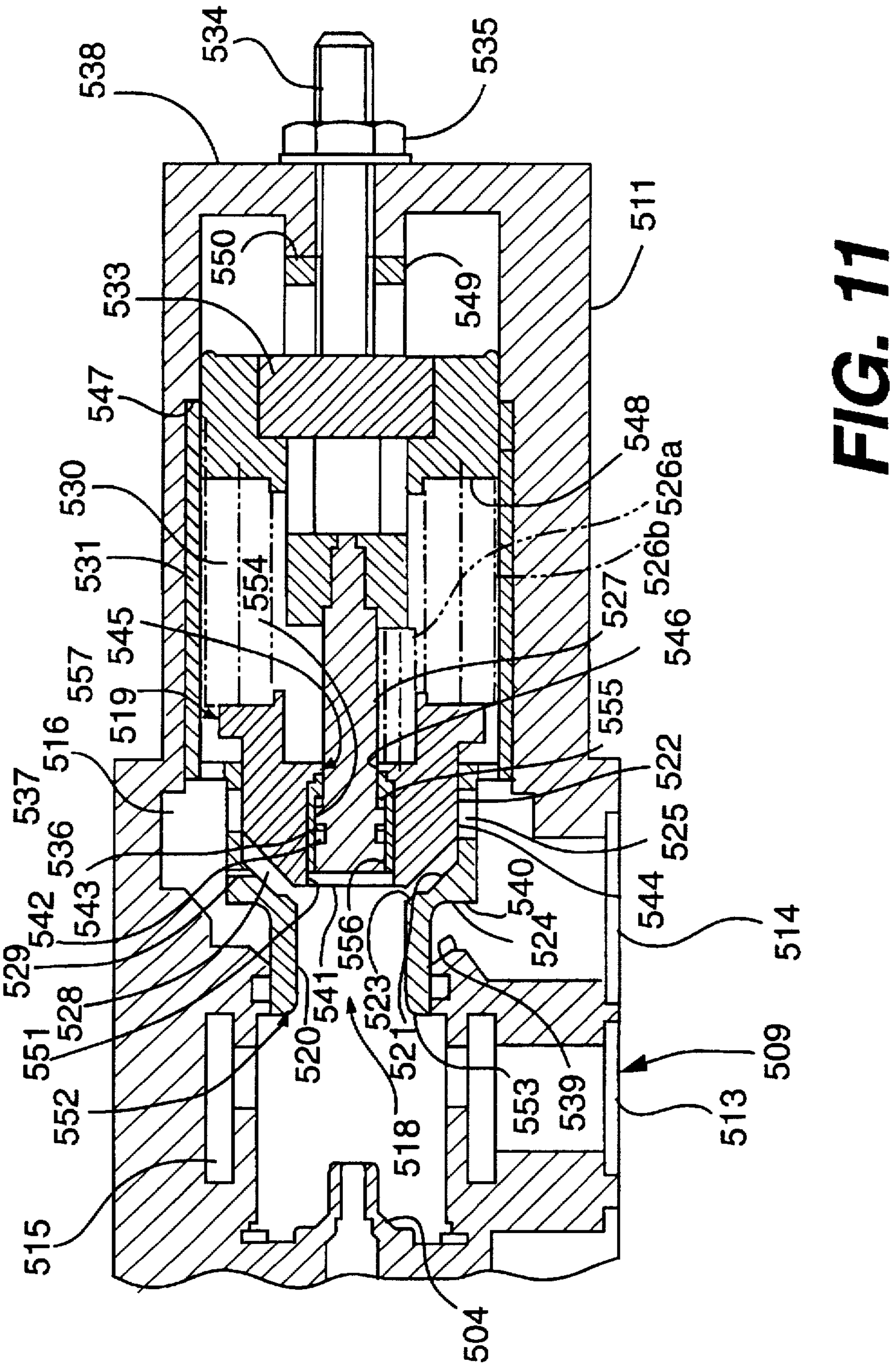
FIG. 11 PRIOR ART
FIG. 11 is a cross section of an essential part of a conventional example when the relief valve is slightly open.
Figure 12:
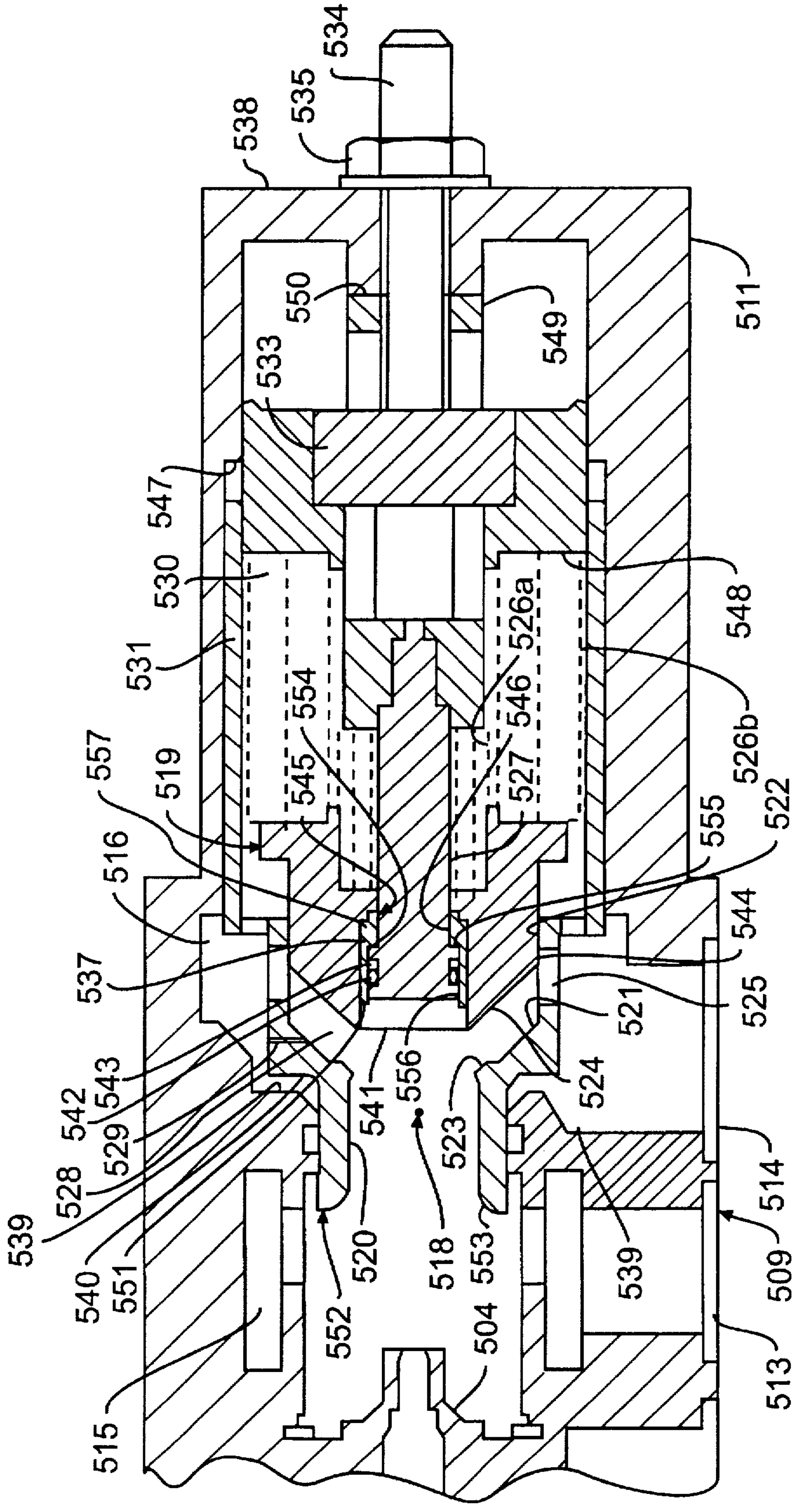
FIG. 12 PRIOR ART
FIG. 12 is a cross section of an essential part of a conventional example when the relief valve fully opens.
Figure 13:
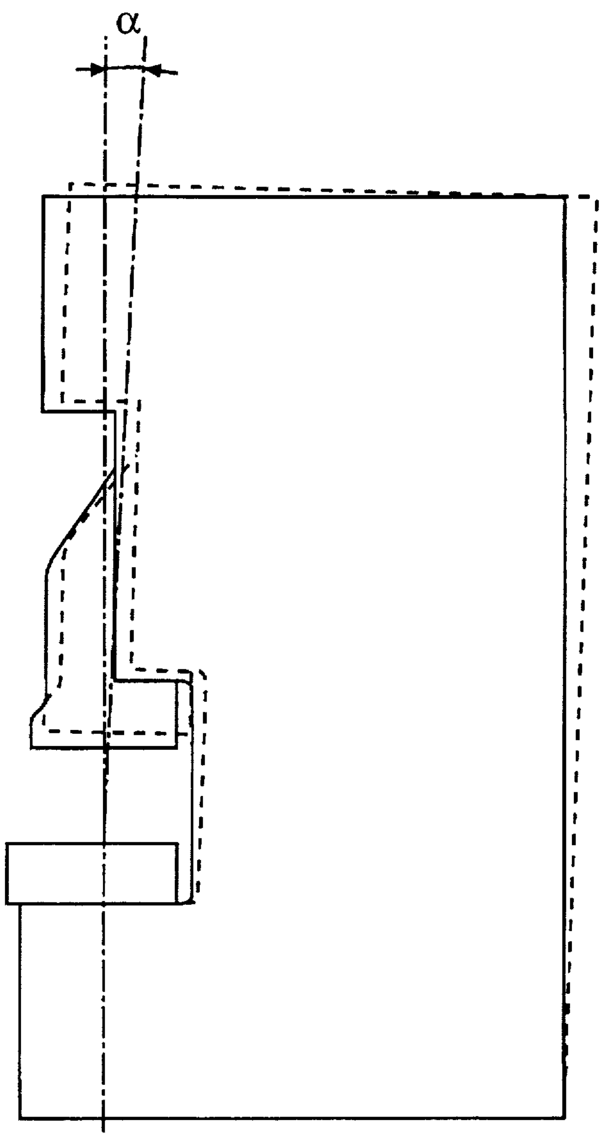
FIG. 13 is a side view showing elastic deformation of a C-type press.
Figure 14:
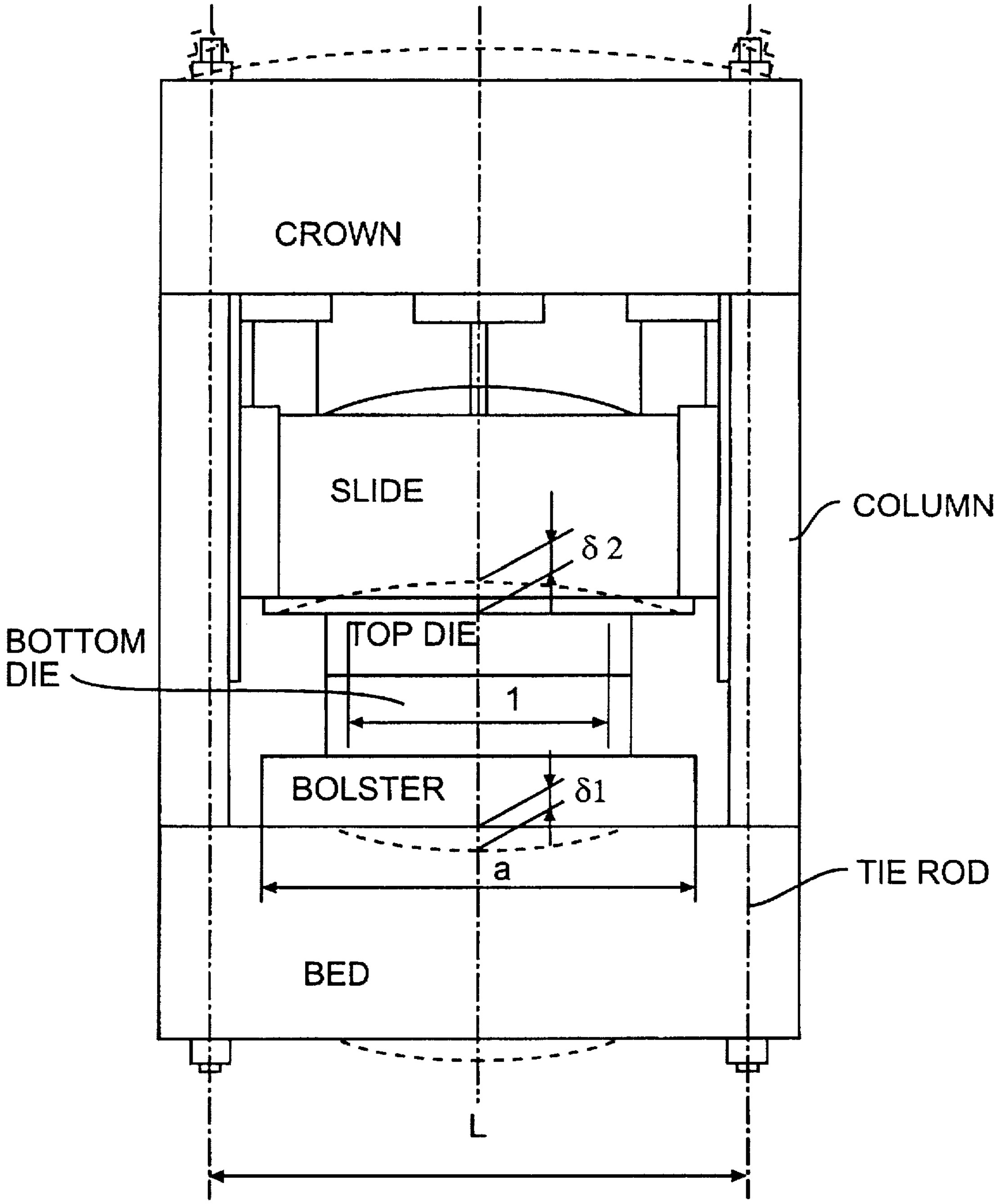
FIG. 14 is a front view showing elastic deformation of a straight side type press.
Figure 15:
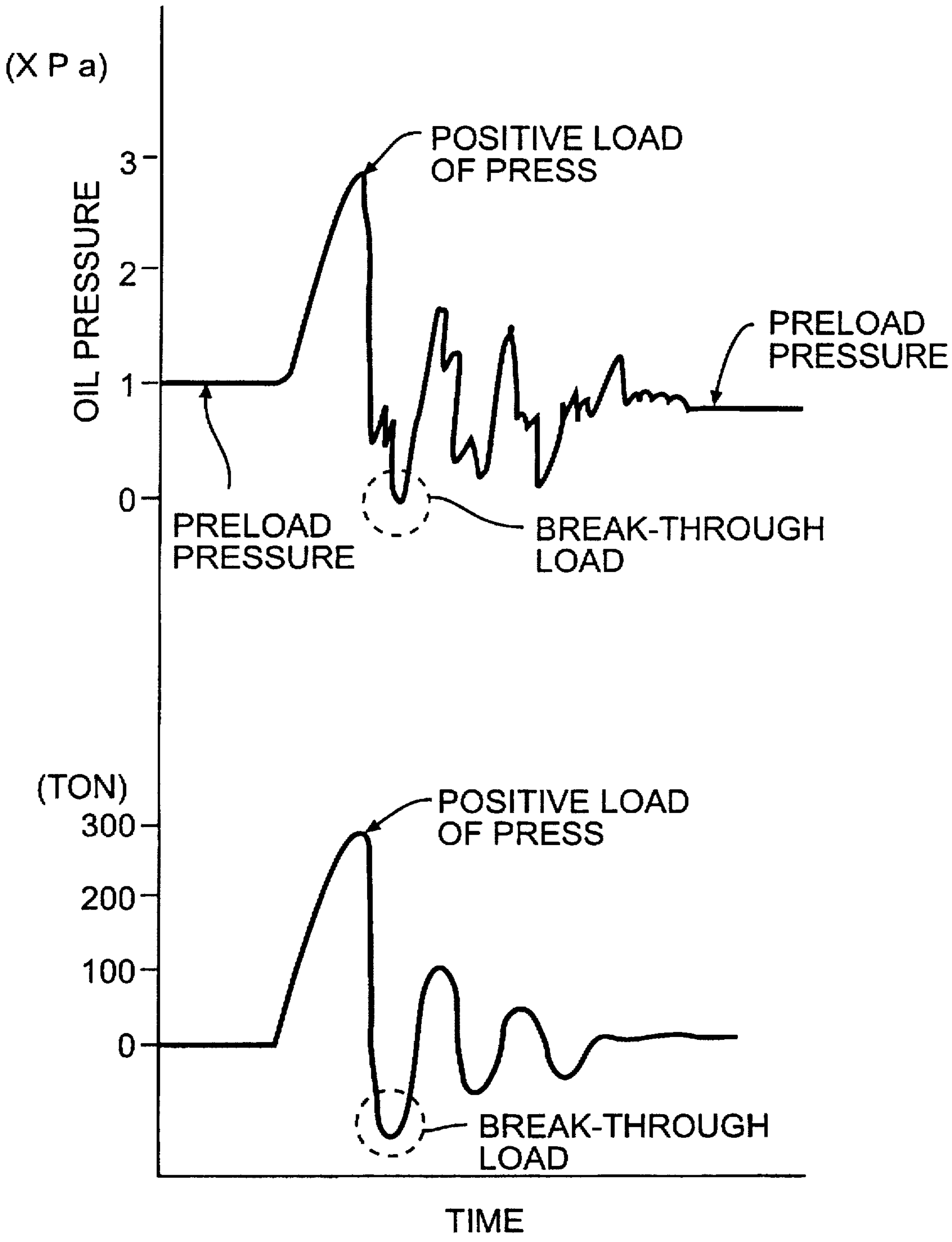
FIG. 15 is a graph showing the condition in which hydraulic/press load is varied.

As shown in FIG. 1 and FIG. 6, the guide sleeve 433 internally fitted to the said pressure setting chamber 432 has a hollow section continuously following the oil passing hole 411 of the main valve element 410, and to this hollow section, a spring support seat 434 is arranged free to advance and retreat in the axial direction of the pressure setting chamber 432, and to this spring support seat 434, a connecting rod 436 is internally fitted, and an adjusting screw 437 inserted to be freely driven forward and backward to the end wall 435 of the valve case 404 is rotatably connected, and rotating this adjusting screw 437, the spring support seat 434 advances and retreats in the pressure setting chamber 432 via the said connecting rod 436, and by fixing this adjusting screw 437 to the valve case 404 with a fixing screw 438, the position of the spring support seat 434 is fixed.

To the pilot valve element 412, a center hole 439 is drilled through along the shaft center, and the tip end of the shaft-form support 440 protruding from the said spring support seat 434 is rushed into this center hole 439.

Figure 2:
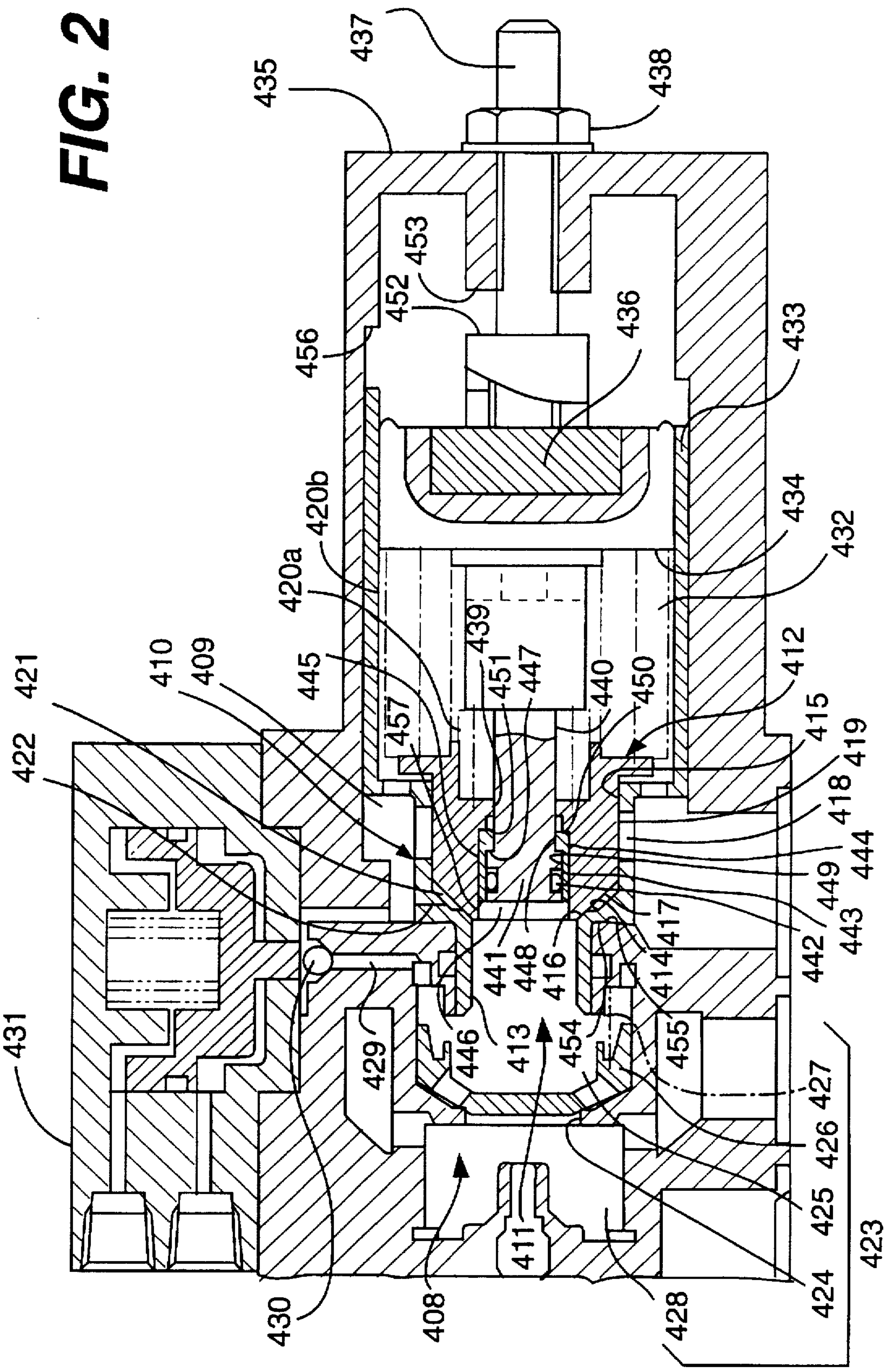
FIG. 2 is a cross section of an essential part of one embodiment of this invention when oil pressure is atmosphere (0 pressure)

As shown in FIG. 2 and FIG. 6, to the tip end of this support 440, a head 441 expanded in a stepped form is formed, and to this head 441, a sealing member 442 comprising O-rings and a backup ring 443 are externally fitted and supported.

By expanding the pressure chamber 408 side of the center hole 439 of the pilot valve element 412 in a stepped form, a sub valve chest 444 is formed, and to this sub valve chest 444, a sub valve element 445 is externally fitted to the tip end of the support 440, sealing member 442, and backup ring 443 free to advance and retreat.

The center hole 446 of this sub valve element 445 is formed with holes with different diameters, and by receiving the stepped surface 447 with the end surface 448 of the head 441 on the pressure setting chamber 432 side, the sub valve element 445 is prevented from escaping from the support 440 to the pressure chamber 408 side, and by allowing the sealing member 442 to closely adhere to the inner circumferential surface of this center hole 446, the clearance between the sub valve element 445 and the support 440 can be sealed.

This sub valve element 445 comprises a cylindrical surface 449 slidably and internally in contact with the sub valve chest 444 and a sub valve surface 450 in a cone shape following the pressure setting chamber 432 side, and by bringing the sub valve seat 451 formed in the sub valve chest 444 into contact and isolating it from the pressure chamber 408, the clearance between the sub valve element 445 and the pilot valve element 412 is opened and closed by a poppet system.

As shown in FIG. 2, internal pressure of the pressure chamber 408 moves to the pressure chamber 408 side when it is below the specified pressure, and between the support 440 and the pilot valve element 412 when the support end face 452 is isolated from the end face 453 at the depth of the valve case, the end face 448 of the head 441 of the support 440 presses and closes the sub valve surface 450 of the sub valve element 445 against the sub valve seat 450 of the pilot valve element 412 via the stepped surface 447 of the sub valve element 445, and at the same time, as shown in FIG. 3 to FIG. 6, internal pressure of the pressure chamber 408 moves to the pressure setting chamber 432 side when it exceeds the specified pressure, and between the support 440 and the pilot valve element 412 when the support end face 452 comes in contact with the end face 453 at the depth of the valve case, a support spring **420*a* is arranged for generating force to either press or energize the pilot valve face 417 of the pilot valve element 412 against the pilot valve seat 416 of the main valve seat 410**.

In addition, as shown in FIG. 1 to FIG. 6, between the spring support seat 434 and the pilot valve element 412, there arranged is a pressure setting spring **420*b* for generating force to press the pilot valve face 417 of the pilot valve element 412 against the pilot valve seat 416 of the main valve element 410 and energizing it on the pilot valve seat 416** side.

The main valve element 410 and the pilot valve element 412 move to the pressure chamber 408 side with the relevant pressure setting spring **420*a* when internal pressure of the pressure chamber 408 is lower than the specified pressure, and the main valve element center end face 454 returns to the valve case, comes in contact to the side end face 455, restricting the move to the pressure chamber 408 side, and when internal pressure of the pressure chamber 408 exceeds the specified pressure, they move to the pressure setting chamber 432 side by internal pressure of the pressure chamber 408 opposite to the relevant pressure setting spring 420*a*, and the main valve element 410 has the guide sleeve 433 brought in contact with the valve case center end face 456, and the pilot valve element 412 has the support end face 452 brought in contact with the valve case depth end face 453, restricting the move to the pressure setting chamber 432** side.

When internal pressure of the pressure chamber 408 is below the specified pressure and the main valve element 410 and the pilot valve element 412 have moved to the pressure chamber 408 side, the sub valve surface 451 of the sub valve element 445 presses and closes the sub valve seat 450 of the pilot valve element 412 with spring force of the support spring **420*a*, and when internal pressure of the pressure chamber 408 exceeds the specified pressure, they move to the pressure setting chamber 432 side and the support end face 452 comes in contact with the valve case depth end face 453, and when movement to the pressure setting chamber 432 side is restricted, the pressure chamber 408 side end face 457 of the sub valve element 445 bears internal pressure of the pressure chamber 408 exceeding the specified pressure and generates thrust to the pressure setting chamber 432 side, and the sub valve face 450 of the sub valve element 445 presses and closes the sub valve seat 451 of the pilot valve element 412**.

As shown in FIG. 2 to FIG. 6, a pilot chamber 421 is formed between the taper section 414 of the main valve element 410 and the pilot valve surface 417 of the pilot valve element 412, and an orifice 422 which communicates this pilot chamber 421 with the portion of the valve chest 409 on the outer circumference of the main valve element 410 is formed on the main valve element 410.

In addition, as shown in FIG. 1 to FIG. 6, to the said pressure chamber 408, there is installed a check valve 423 that closes and prevents backflow of internal pressure of the load circuit from the valve chest 409 side to the load circuit side when internal pressure of the load circuit decreases below the preload pressure.

As shown in FIG. 2 and FIG. 6, this check valve 423 is equipped with a check valve seat 424 protruded in an internal brim form at the intermediate portion in the axial direction of the said pressure chamber 408 and with this check valve seat 424, the pressure chamber 408 is partitioned into an upstream chamber 428 and a downstream chamber 425.

This check valve 423 comprises a check valve element 426 internally and slidably fitted to this downstream chamber 425 in the axial direction of the pressure chamber 408, and a check spring 427 arranged in the downstream chamber 425 for energizing this check valve element 426 towards the check spring seat 424.

Figure 3:
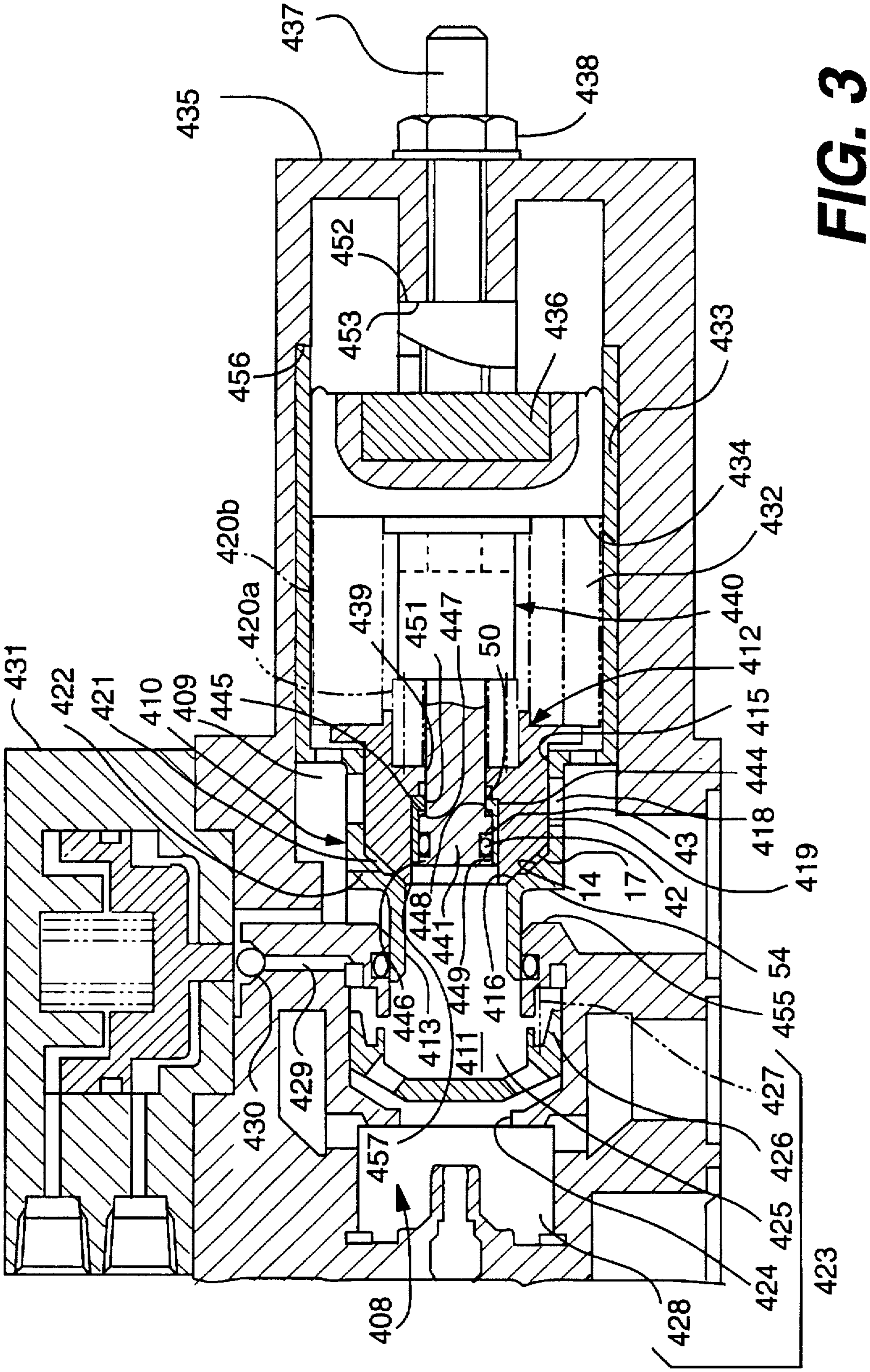
FIG. 3 is a cross section of an essential part of one embodiment of this invention when preload pressure for opening the check valve is being generated.

When the press is at standstill, internal pressure of the pressure chamber 408 is held to atmosphere (pressure: 0), and as shown in FIG. 2, the main valve element 410 is located at the position where it has moved farthest to the pressure chamber 408 side, and the pilot valve element 412 is energized to be located at the position where it is received to the pilot valve seat 416 by the pressure setting spring **420*a*, and the check valve element 426 is held pressed against the check valve seat 424 by the elasticity of the check spring 427. For preparing to drive the press, the hydraulic pump 402 is started, and when internal pressure of the pressure chamber 408 exceeds the specified pressure, the check valve element 426 is driven to the valve chest 409 side by the differential pressure between the inner pressure of the upstream chamber 428 and that of the downstream chamber 425 and the check valve 423 is opened, and the main valve element 410 and the pilot valve element 412 are moved to the pressure setting chamber 433 side while resisting the pressure setting spring 420*a* by internal pressure of the pressure chamber 408, and as shown in FIG. 3, the guide sleeve 433 is received with the valve case center end face 456 of the valve case 404, the move of the main valve element 410 to the pressure setting chamber 432 side is restricted, and in addition, the support end face 452 comes in contact with the valve case depth end face 453, and the pilot valve element 412 presses and closes the pilot valve surface 417 against the pilot valve seat 416 of the main valve element 410 with the energizing force of the support spring 420*a* and pressure setting spring 420*b***.

Figure 4:
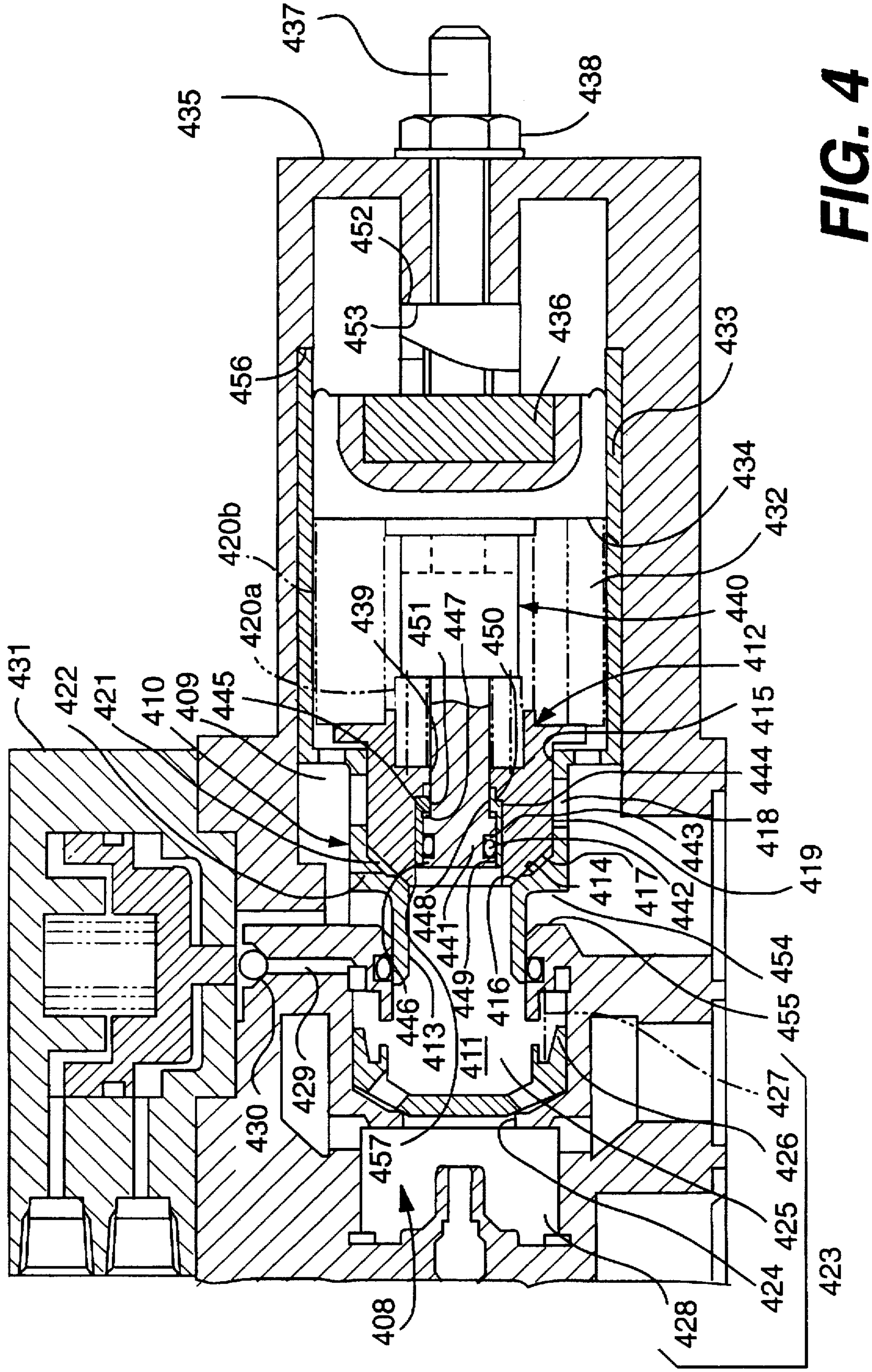
FIG. 4 is a cross section of an essential part of one embodiment of this invention when the check valve is closed after preload pressure is generated.

And when internal pressure of the pressure chamber 408 reaches the preload pressure, the hydraulic pump 402 stops as shown in FIG. 4. In this event, the support spring **420*a* contributes to securing the minimum reference value of relief pressure (for example, 2 MPa), and screwing the adjusting screw 437 varies the spring force of the pressure setting spring 420*b***, contributing to adjusting pressure setting in the relief pressure setting range (for example, 2–3.5 MPa) exceeding the minimum reference value.

By allowing the support end face 452 to come in contact with the valve case depth end face 453, influences of internal pressure of the pressure chamber 408 on the pressure bearing area of the end face formed on the pressure chamber 408 side by the head 441 of the support 440 and the sub valve element 445 are eliminated, and the pilot valve element 412 bears internal pressure of the pressure chamber 408 with a small doughnut-ring-shape pressure bearing area between the sub valve seat 451 of the pilot valve element 412 and the pilot valve seat 416 of the main valve element 410, the energizing force to oppose this pressure can be reduced, and to oppose high relief pressure (for example, Max. 3.5 MPa), using the small support spring **420*a* and the pressure setting spring 420*b*, the pilot valve face 417 of the pilot valve element 412 can be pressed against the pilot valve seat 416 of the main valve element 410 or energized to the relevant pilot valve seat 416** side, and a compact relief valve mechanism with low inertia and high response can be formed.

When internal pressure of the pressure chamber 408 reaches the preload pressure, operation of the hydraulic pump 402 automatically stops, and thereafter, if for some reason, internal pressure of the pressure chamber 408 lowers the specified preload pressure, the hydraulic pump 402 automatically restarts and internal pressure of the pressure chamber 408 is designed to be recovered to the specified preload pressure.

Figure 5:
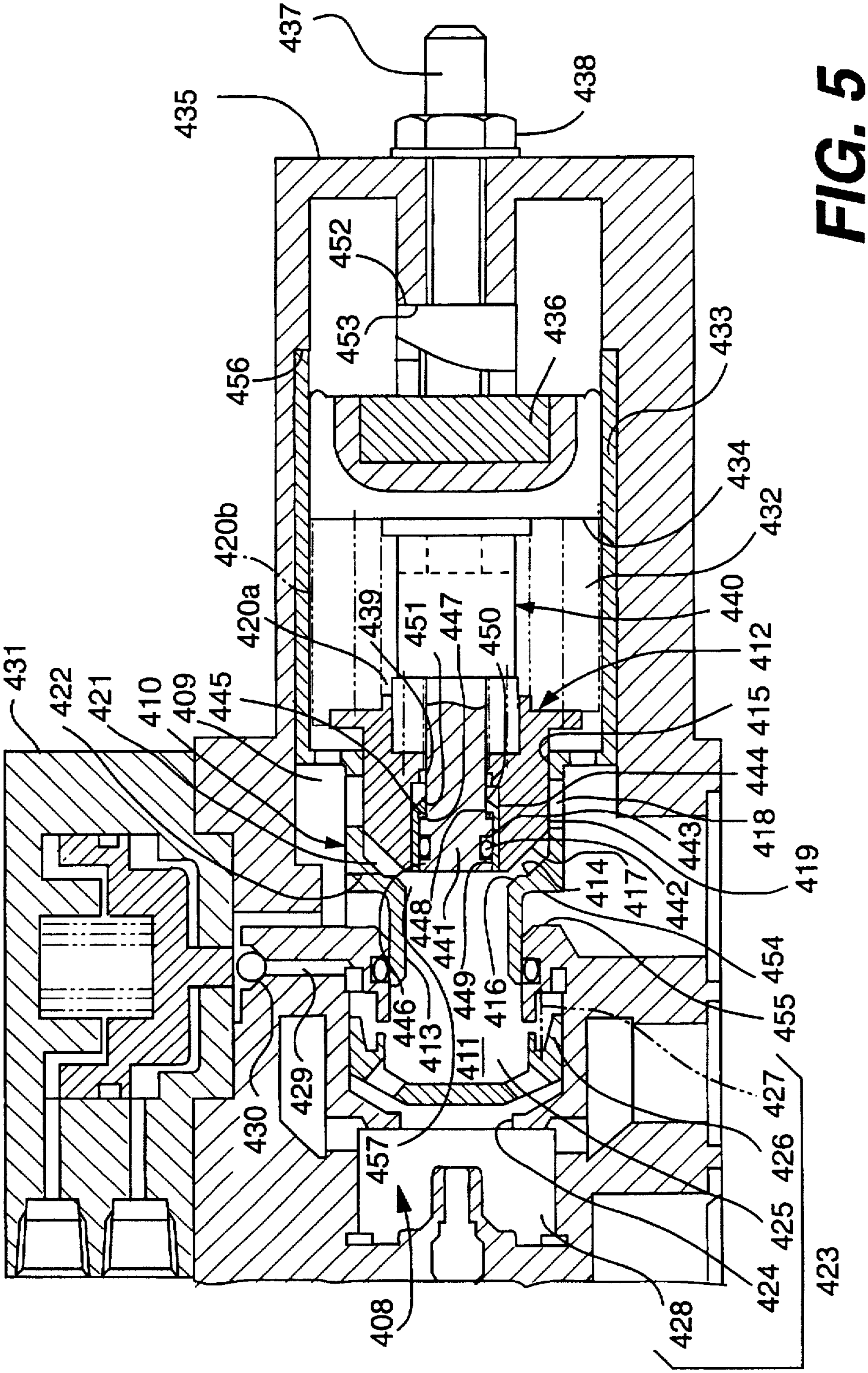
FIG. 5 is a cross section of an essential part of one embodiment of this invention when the check valve is slightly open by slightly opening of the relief valve.

When press-forming begins, the load increases when the slide begins to come in contact with the work piece, and in response to this increase of the load, internal pressure of the pressure chamber 408 increases from the preload pressure. Now, due to oil temperature rise or occurrence of overload, internal pressure of the pressure chamber 408 increases in proportion to the increase of the load, and internal pressure of the pressure chamber 408 is applied to the doughnut-ring-shape pressure bearing area between the sub valve seat 451 of the pilot valve element 412 and the pilot valve seat 416 of the main valve element 410, and if the thrust by this oil pressure exceeds the set pressure of the support spring **420*a* and the pressure setting spring 420*b*, as shown in FIG. 5, the pilot valve element 412 separates from the pilot valve seat 416, allowing the pressurized oil in the pressure chamber 408 to pass the small-diameter section 413, pilot valve seat 416, pilot chamber 421, orifice 422, and the valve chest 409, and flow out from the return port 407**.

For example, if pressure rise of the pressure chamber 408 is slow as in the case of increased pressure due to temperature rise of pressurized oil, while the isolating distance from the pilot valve surface 417 to the pilot valve seat 416 and the flowing in rate of pressurized oil from the pressure chamber 408 to the pilot chamber 421 is still small, discharging pressure from the orifice 422 to the valve chest 409 lowers the inner pressure of the pilot chamber 421 and the pressure chamber 408 more than that of the relief set pressure, and the pilot valve element 412 is pressurized by the pilot valve seat 416 by the support spring **420*a* and the pressure setting spring 420*b* without opening the main valve hole 418**.

Now, for example, at the time of brake-through load where the load suddenly disappears due to completion of punching when the press is operating under the condition lower than the specified capacity, as described above, each press elastically deforms due to pressurization and rapidly discharges the energy accumulated, and tries to recover the original profile, and as a result of exerting the force opposite to the load at the time of press-forming, the hydraulic cylinder 508 rapidly extends too far due to inertia of for example the slide 507, and inner pressure of the load circuit 505 described above converges to the preload pressure while pulsating over the top and the bottom of the preload pressure because of the negative pressure force lower than the preload pressure, which should be the minimum pressure to be originally maintained by the load circuit 505, or because it also becomes negative pressure due to inertia in the same manner by sticking behavior of general hydraulic cylinders operating at high variable speed and general hydraulic cylinders, and converges to the preload pressure while pulsating over the top and the bottom of preload pressure, inner pressure of the upstream chamber 428 lowers below the preload pressure, as shown in FIG. 4, the check valve element 426 is pressed against the check valve seat 424 by differential pressure of oil pressure exerted on both sides of the check spring 427 and check valve element 426 to apply the hydraulic lock, thereby preventing the pressure on the downstream chamber 425 side from lowering the preload pressure.

As a result, the main valve element 410 and the pilot valve element 412 are prevented from rushing into the pressure chamber 408 side by being subject to negative pressure or from being vibrated by pulsation of oil pressure over the top and the bottom of the preload pressure generated in the upstream chamber 428, thereby preventing the relief valve from opening to release pressure below the specified relief pressure due to vibration due to said pulsation of oil pressure generated by stick behavior of the hydraulic cylinder for detection of brake-through load or overload, or malfunction of the relief valve 401 in which the valve does not open and release pressure above the specified relief set pressure.

If pressure rise of the pressure chamber 408 is excessively rapid, because the volume of pressurized oil flowing into the pilot chamber 421 is excessively as shown in FIG. 5, pressure reduction by release of pressurized oil from this orifice 422 to the valve chest 409 can be neglected, allowing inner pressure of the pressure chamber 408 to exert on the overall pilot valve surface 417 and the pilot valve element 412 rapidly moves to the side opposite to the pressure chamber 408. At the same time, as shown in FIG. 6, inner pressure of the pressure chamber 408 is also exerted on the whole taper section 414 to rapidly move the main valve element 410 to the pressure chamber 408 side, enabling the main valve hole 418 to instantaneously open. Needless to say, because the check valve 422 opens due to the differential pressure of inner pressure between the upstream chamber 428 side and the downstream 425 side, the instantaneous opening of the main valve hole 418 helps a large volume of pressurized oil be released from the load circuit to the return oil passage without being interfered by the check valve 423, and the overload condition is instantaneously canceled.

When this large volume of pressurized oil is released, the opening valve operation of the said main valve element 410 is detected to stop operation of the hydraulic pump 402 and at the same time stop the operation of the press, preventing occurrence of overload from being repeated.

Now, because inner pressure of the downstream chamber 425 reaches high pressure close to inner pressure at the time of maximum load due to the said hydraulic lock, in the following press process, the oil volume sealed in the load circuit is reduced by the amount equivalent to that of the downstream chamber 425 and the inner pressure of the upstream chamber 428 when the same maximum load is exerted becomes slightly higher than the previous maximum pressure. Consequently, if press-forming is repeated, the inner pressure of the downstream chamber 425 gradually increases, possibly impairing the response of the relief valve 401 when overload occurs.

Therefore, in this embodiment, to solve this problem, an internal oil passage between the check valve 423 and the main valve element 410 and the pilot valve element 412, that is, a reset oil passage 429 which freely communicates the portion downstream from the check valve element 426 of the downstream chamber 425 with the return port 407 via the valve chest 409, a reset valve 430 for opening and closing this reset oil passage 429, and a reset operation means 431 for opening and closing the reset valve 430 in linkage to the press operation are mounted.

That is, when press-forming for each cycle is completed and the bolster begins rising, the reset valve 430 is opened for only a short specified time and inner pressure of the downstream chamber 425 is reduced to the pressure same as that of the valve chest 409, thereby opening the check valve 423 and canceling the hydraulic lock, and inner pressure of the downstream chamber 425 and the portion upstream from the pilot valve seat 416 of the oil passage hole 411 is designed to be returned to the same pressure (preload pressure) as that of the upstream chamber 428.

Following this cancellation of the hydraulic lock, pressurized oil of the load circuit slowly decreases, possibly causing the inner pressure of the upstream chamber 428 and the downstream chamber 425 to be lower than the preload pressure, but in this case, the hydraulic pump 412 automatically restarts to replenish the upstream chamber 428 and the downstream chamber 425 with pressurized oil, and the inner pressure of the upstream chamber 428 and the downstream chamber 425 is recovered to the preload pressure, creating no problem.

Since fully opening of the reset valve 430 enables the inner oil passage between the check valve 423 and the main valve element 410 and the pilot valve element 412, that is, the portion downstream from the check valve element 426 of the downstream chamber 425 to be communicated to the return port 407 via the valve chest 409 by the reset oil passage 429, as soon as the hydraulic lock is canceled, the inner pressure between the check valve 423 and main valve element 410 and the pilot valve element 412 is released to atmosphere, which is followed by the inner pressure of the load port 406.

As described above, at the brake-through where the load suddenly disappears by completion of press punching under the condition lower than the specified rated capacity, the press proper elastically deforms due to pressurization and rapidly discharges the accumulated energy to return to the normal profile, and the force opposite to the load at the time of press-forming is exerted to the press proper. As a result, due to inertia of the slide of presses, the hydraulic cylinder rapidly extends excessively, and the inner pressure of the load circuit reaches the negative pressure lower than the preload pressure which should be the minimum pressure to be originally maintained by the load circuit, and the inner pressure converges to the preload pressure while pulsating over the top and the bottom of the preload pressure, or it attains the negative pressure by inertia in the same manner by the stick operation of the general cylinders operation at high variable speeds and general hydraulic cylinders and converges to the preload pressure while pulsating the top and the bottom of the preload pressure, but because the relief valve of this invention has the check valve for preventing the backflow from the valve element side to the load port side intervened at the portion of the inner oil passage between the load port and the valve element, when the load port side pressure lowers to the negative pressure lowering the minimum pressure, such as preload pressure of for example an overload safety device, which should be originally maintained, and pulsates over the top and the bottom of the minimum pressure, the hydraulic lock can be applied with the check valve, thereby enabling prevention of malfunctions in that the valve element rushes into the load port side due to vibration caused by the said pulsation of pressurized oil, the valve is released below the specified relief set pressure, and the press makes an abnormal stop, or the press is unable to exhibit the rated pressurizing capacity, or the valve is unable to be released above the specified relief set pressure, abnormal pressurizing capacity is generated, the press slide and the dies bite into the work piece, and the press proper is unable to be protected.

In particular, in this invention, when in particular a reset oil passage which communicates the portion of the inner oil passage between the load port and the relief valve element to the return port and a reset valve for opening and closing this reset oil passage are equipped, it is possible to release the hydraulic lock and reset pressurized oil at the load port by communicating the portion of the inner oil passage between the load port and the valve element to the return port by the reset oil passage, and repeating load fluctuations, pressure between the check valve and the relief valve element gradually increases, thereby preventing impairing of the response of the relief valve.

In addition, as soon as the hydraulic lock is canceled by enabling the inner oil passage between the check valve and the main valve element and the pilot valve element to communicate to the return port via the valve chest by means of the reset oil passage by fully opening of the reset valve, the inner pressure between the check valve and main valve element, and the pilot valve element can be released to atmosphere, which is followed by the inner pressure of the load port, thereby stabilizing the relief valve against the said high and low pulsating pressure, and at the same time, satisfying the requirements for the zero mechanical state (the energy existing in the equipment is brought to zero when the equipment is at standstill) as one of the recent safety design philosophies.

What is claimed is:

1. A relief valve comprising:

a valve case having a load port, a return port, a valve chest and a primary passage formed therein, the primary passage allowing the valve chest to be in free communication with a load circuit outside of the valve case;

a main valve element arranged in the valve case within the primary passage, the main valve element forming an oil passage having a small diameter section, a tapered section in which the diameter gradually increases, and a large diameter section, a pilot valve seat formed in the main valve at a junction between the small diameter section and the tapered section, a main valve hole formed in the large diameter section of the main valve element;

a pilot valve element arranged in the valve case, a tip end of the pilot valve element having a tapered portion and a large diameter portion for engaging the tapered section and the large diameter section, respectively of the main valve element, the pilot valve element being in sealable contact with and forced against the pilot valve seat of the main valve element by an energizing means;

a support mounted within the valve case;

a sub-valve element externally mounted to the support and movable axially on the support;

a sealing member for sealing a clearance between the support and the sub-valve member; and a check valve within the primary passage for preventing backflow from the return port to the load port;

wherein when pressure bearing on the pilot valve element is rapidly increased, the pilot valve element is separated from the pilot valve seat of the main valve against the force of the energizing means and the main valve is moved in a direction away from the pilot valve thereby opening the main valve hole, the check valve preventing backflow when the pressure drops below an amount sufficient to overcome the biasing of the energizing means.

2. The relief valve according to claim 1, wherein a reset oil passage communicates a portion of the oil passage between the check valve and the return port and a reset valve opens and closes the reset oil passage.

3. A relief valve comprising:

a valve case having a load port, a return port, a valve chest and a primary passage formed therein, the primary passage allowing the valve chest to be in free communication with a load circuit outside of the valve case;

a main valve element arranged in the valve case within the primary passage, the main valve element forming an oil passage having a small diameter section, a tapered section in which the diameter gradually increases, and a large diameter section, a pilot valve seat formed in the main valve at a junction between the small diameter section and the tapered section, a main valve hole formed in the large diameter section of the main valve element;

a pilot valve element arranged in the valve case, a tip end of the pilot valve element having a tapered portion and a large diameter portion for engaging the tapered section and the large diameter section, respectively of the main valve element, the pilot valve element being in sealable contact with and forced against the pilot valve seat of the main valve element by an energizing means;

a check valve within the primary passage for preventing backflow from the return port to the load port;

wherein when pressure bearing on the pilot valve element is rapidly increased, the pilot valve element is separated from the pilot valve seat of the main valve against the force of the energizing means and the main valve is moved in a direction away from the pilot valve thereby opening the main valve hole, the check valve preventing backflow when the pressure drops below an amount sufficient to overcome the biasing of the energizing means.

4. The relief valve according to claim 3, wherein a reset oil passage communicates a portion of the oil passage between the check valve and the return port and a reset valve opens and closes the reset oil passage.

* * * * *